United States Patent
Krupke

(10) Patent No.: US 7,145,931 B2
(45) Date of Patent: Dec. 5, 2006

(54) DIODE PUMPED ALKALI-MOLECULAR LASERS AND AMPLIFIERS

(76) Inventor: William F. Krupke, 1564 Foothill Rd., Pleasanton, CA (US) 94588

( * ) Notice: Subject to any disclaimer, the term of this patent is extended or adjusted under 35 U.S.C. 154(b) by 0 days.

(21) Appl. No.: 10/832,490

(22) Filed: Apr. 26, 2004

(65) Prior Publication Data

US 2004/0228383 A1    Nov. 18, 2004

Related U.S. Application Data

(60) Provisional application No. 60/469,145, filed on May 12, 2003.

(51) Int. Cl.
*H01S 3/094* (2006.01)
(52) U.S. Cl. .............................. 372/75; 372/56; 372/70
(58) Field of Classification Search ................ 372/75, 372/55, 56, 70
See application file for complete search history.

(56) References Cited

U.S. PATENT DOCUMENTS

| | | | |
|---|---|---|---|
| 5,774,490 A | 6/1998 | Miller et al. | 372/89 |
| 5,786,893 A * | 7/1998 | Fink et al. | 356/301 |
| 6,643,311 B1 | 11/2003 | Krupke | 372/56 |
| 6,693,942 B1 * | 2/2004 | Krupke | 372/75 |

OTHER PUBLICATIONS

John E. McCord, Harold C. Miller, Gordon Hager, Alan I. Lampson, and Peter G. Crowell, "Experimental Investigation of an Optically Pumped Mid-Infrared Carbon Monoxide Laser", IEEE J. Q. E., 35, 1602-1612 (1999).

J. E. McCord, A. A. Ionin, S. P. Phipps, P. G. Crowell, A. I. Lampson, J. K. McIver, A. J. W. Brown, and G. D. Hager, "Frequency-tunable Optically Pumped Carbon Monoxide Laser", IEEE J. Q. E., 36, 1041-1052 (2000).

S. V. Vassiliev, M. A. Kyzmina, T. T. Basiev, and G. D. Hager, "Numerical modeling and optimization of the optically pumped mid-infrared molecular laser", High-Power Laser Ablation IV, Proc. SPIE, 4760, 1067-1077 (2002).

W. F. Krupke, R. J. Beach, V. K. Kanz, and S. A. Payne, "Resonance transition 795 nm ruibidium laser", Optics Letters, 28, 2336 (2003).

E. R. Fisher and G. K. Smith, "Vibration-Electronic Coupling in the Quenching of Electronically Excited Alkali Atoms by Diatomics", Applied Optics, 10, 1803-1813 (1971).

E. R. Fisher and G. K. Smith, "Vibrational relaxation by metal atoms", Chem Phys. Lett., 6, 438-440 (1970).

N. Legay, N. Legay-Sommaire, and G. Taieb, "Mechanism of a Co-$N_2$ laser- I. Study of the vibrational populations", Can. J. Phys., 48, 1949-1955 (1970).

David S. Y. Hsu and M. C. Lin, "Electronic-to-Vibrational Energy Transfer Reactions: Na($3\ ^2P$)+CO($^1\Sigma$, v=0)", Chem. Phys. Lett., 42, 78-83 (1976).

J. C. Polanyi, "Vibrational-Rotational Population Inversion", Applied Optics, Suppl. 2, 109 (1965).

C. K. N. Patel, Continuous-wave laser action on the vibrational-rotational transitions of $CO_2$, Phys. Rev, 136, 1187 (1964).

* cited by examiner

*Primary Examiner*—Tuyet Vo
*Assistant Examiner*—Jimmy Vu
(74) *Attorney, Agent, or Firm*—John P. Wooldridge

(57) ABSTRACT

Optically-pumped mid-infrared vibrational-rotational transition gas lasers and amplifiers with improved efficiency and practicality. Inventive laser and amplifier devices include: laser active media comprising a mixture of alkali vapor, selected hetero-nuclear molecular gas, and one or more buffer gases; conventional semiconductor laser diode pump sources with nanometer scale spectral bandwidths; and preferential laser emission in ro-vibrational transitions among relatively low-lying vibrational levels.

28 Claims, 4 Drawing Sheets

DIODE PUMPED ALKALI-MOLECULAR LASERS AND AMPLIFIERS

This application claims priority to U.S. Provisional Patent Application Ser. No. 60/469,145, filed May 12, 2003, titled: "Diode Pumped Alkali-Molecular Laser," incorporated herein by reference.

BACKGROUND OF THE INVENTION

1. Field of the Invention

The present invention relates generally to diode pumped lasers and amplifiers and more specifically it relates to diode pumped vibrational-rotational transition gas lasers and amplifiers in which the active medium comprises a mixture of alkali vapor, selected hetero-nuclear molecular gas, and one or more buffer gases.

2. Description of Related Art

Mid-infrared vibrational-rotational transition, hetero-nuclear molecular lasers have been known for years. Typically, these lasers are energized using either chemical reactions (as in the HF, DF, HBr, CO, etc. lasers), or electrical discharges (as in the CO lasers).

The main problem with chemically pumping these lasers is the need to provide highly reactive, potentially dangerous chemical precursors to generate excited laser molecules. In the case of military use of such lasers, it is also necessary to establish a separate costly logistics supply chain of chemical precursors in the field. The main problem with electrical discharge pumping of CO lasers is that such lasers typically produce radiation at output wavelengths at approximately greater than 5.6 microns (from higher-lying vibrational levels), radiation which does not transmit through the atmosphere with low loss (i.e., as does radiation in the 4.6–5.3 microns region). Thus, there has been a long-standing need to replace the chemical or electrical discharge excitation sources with more effective and practical excitation sources to realize practical and useful mid-infrared hetero-nuclear molecular lasers.

One approach to solving this problem is the use of a laser pump source to directly excite the vibrational levels of the laser active hetero-nuclear molecules by direct absorption of pump radiation. To efficiently couple laser pump energy into the hetero-nuclear molecules, whose ro-vibrational transitions are characterized by quite narrow spectral widths, it is necessary to use spectrally narrowed pump laser sources [ref. 1–4, and references therein]. While the efficacy of optical pumping has been validated in terms of the physics of laser action, the realization of practical optical pumping of mid-infrared hetero-nuclear molecular lasers cannot be achieved in this manner because the efficiencies of laser pump sources are necessarily depressed because of the need to line-narrow these sources and to set their output wavelengths precisely to the narrow absorption features of the molecular laser gas. Thus, an intrinsically more efficient optical pumping scheme is needed.

Krupke [ref. 5] has patented the concept of efficient, diode-pumped alkali lasers operating on their respective $D_1$ resonance transitions, utilizing low-cost conventional broad-area semiconductor laser diodes and diode arrays with output spectral bandwidths of a nm or more to pump the collision-broadened, spectrally-homogeneous $D_2$ transitions. Notwithstanding the relatively narrow spectral widths of the collision-broadened $D_2$ transitions (typically <0.2 nm at 10 atm of helium buffer gas), efficient absorption of the output radiation of such laser diode sources is achieved by end-pumping the laser gain cell, whose atomic density and length allows for efficient wing-pumping of the alkali atoms. Model calculations, and preliminary laboratory experiments [ref. 6] using a titanium sapphire laser as a surrogate pump source, indicate that pump radiation absorption efficiencies may exceed 80%, and optical-optical laser efficiencies in the range from 50–70% can be attained.

SUMMARY OF THE INVENTION

It is an object of the present invention is to provide optically pumped mid-infrared hetero-nuclear molecular amplifiers and lasers overcoming the shortcomings of the prior art devices.

It is another object of the invention is to provide efficient optically pumped mid-infrared hetero-nuclear molecular amplifiers and lasers using conventional high power semiconductor diode pump sources.

Another object of the present invention is to provide efficient optically pumped mid-infrared hetero-nuclear molecular lasers not requiring the use of potentially dangerous chemical precursors or reaction products for powering the lasers.

Still another object of the present invention is to provide efficient optically pumped mid-infrared hetero-nuclear molecular amplifiers and lasers emitting in laser transitions involving the lower vibrational levels of the hetero-nuclear molecular gases (and consequently emitting in the shorter wavelength regions characterizing each hetero-molecular gas).

Other objects and advantages of the present invention will be apparent to those skilled in the art based on the disclosure herein.

In view of the disadvantages inherent in the known types of chemically, electrically, and optically pumped mid-infrared, hetero-nuclear molecular lasers, the present invention provides a practical means to realize semiconductor laser pumped mid-infrared hetero-nuclear molecular lasers and amplifiers enabled by addition of an alkali vapor component to the active gain medium.

In the laser implementation, the present invention generally comprises an active gain medium contained in a cell, a laser resonator cavity, and a semiconductor laser pump source. The laser gain medium comprises a mixture of alkali vapor, hetero-nuclear molecular gas (active laser species), and appropriate buffer gas(es). This gain medium is contained in a gain cell that, in turn, is placed within a laser resonator cavity formed by two or more cavity mirrors. The radiation from the semiconductor laser pump source, at a wavelength substantially matching the wavelength of either of the so-called $D_1$ or $D_2$ transitions of the specific alkali atom in the vapor, is directed into the active medium gain cell and propagated generally along the axis of the cell, whereupon it is substantially absorbed by the alkali vapor, ultimately causing population inversions to be generated among the ro-vibrational levels of the hetero-nuclear molecular laser active gas, and causing mid-infrared laser action to occur by virtue of the resonant characteristics of the laser resonator cavity. The optically excited alkali-molecular gain medium may also be operated in an amplifier configuration, rather than in a laser configuration, as is well known in the art.

There has thus been outlined, rather broadly, some important features of the invention, in order that the detailed description thereof may be better understood, and in order that the present contribution to the art may be better appreciated. There are additional features of the invention that will be described hereinafter.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention of a diode-pumped alkali-molecular laser combines the efficient diode pump laser excitation of an alkali atom through wing-pumping, and the transfer of excitation energy to a selected molecular collision partner, inducing population inversions between the vibrational levels of the collision partner, thus enabling mid-IR laser action to be achieved on ro-vibrational transitions. The transition wavelengths of the fundamental and $1^{st}$-overtone ro-vibrational bands of the hetero-nuclear molecules of interest in the present invention are listed below [see ref.7]:

CO, fundamental bands: ~4.8 µm; and $1^{st}$ overtone bands: ~2.4 µm;
HF, fundamental bands: ~2.5 µm; and $1^{st}$ overtone bands: ~1.3 µm;
HCl, fundamental bands: ~3.6 µm; and $1^{st}$ overtone bands: ~1.7 µm;
HBr, fundamental bands: ~4.0 µm; and $1^{st}$ overtone bands: ~2.0 µm;
$CO_2$, $\Delta v=[00^01]-[02^00]$: ~9.6 µm, and $\Delta v=[00^01]-[10^00]$: ~10.6 µm; and
$N_2O$, $\Delta v=[00^01]-[02^00]$: ~9.6 µm, and $\Delta v=[00^01]-[10^00]$: ~10.6 µm.

Figure 1:
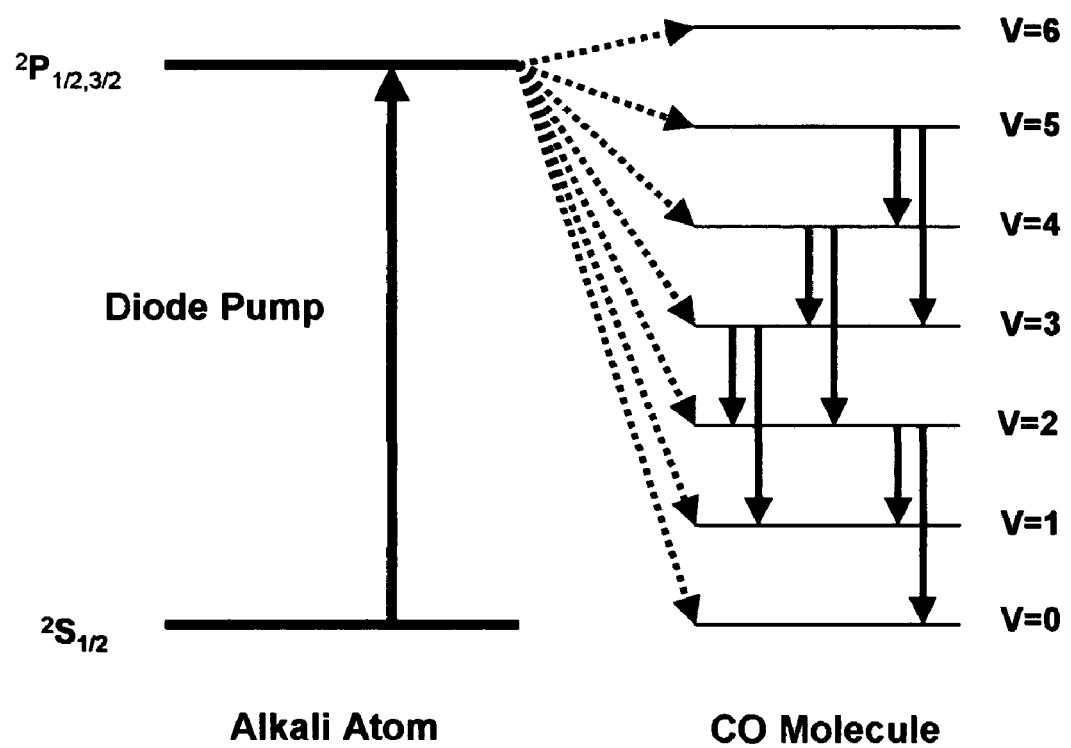
FIG. 1 shows a diode-pumped alkali-molecule laser energy level scheme.
Figure 2A:
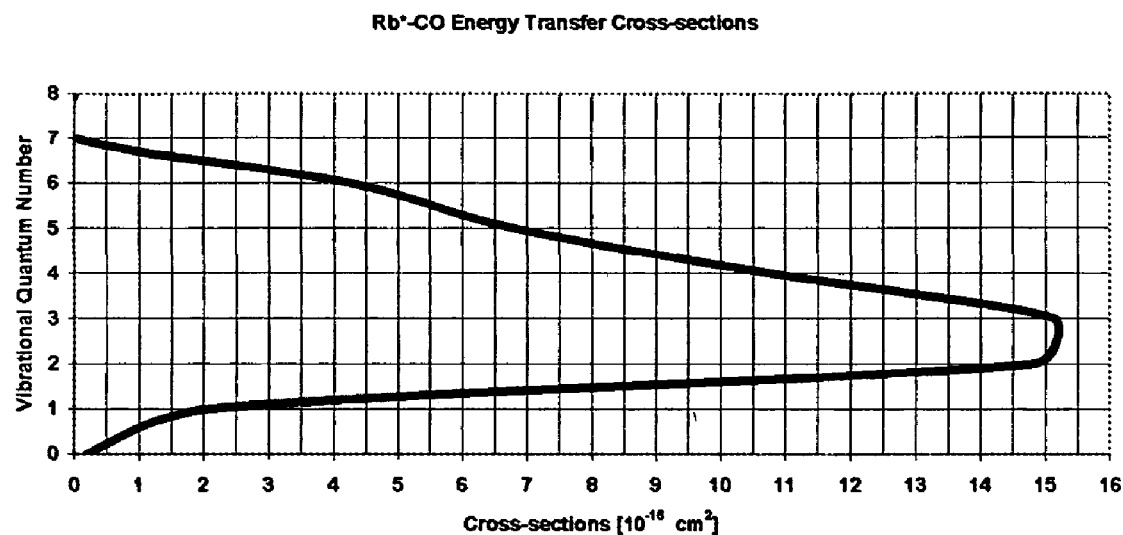
FIGS. 2A–C show energy transfer cross-sections for K*, Rb*, or Cs*+CO (v=0).
Figure 2B:
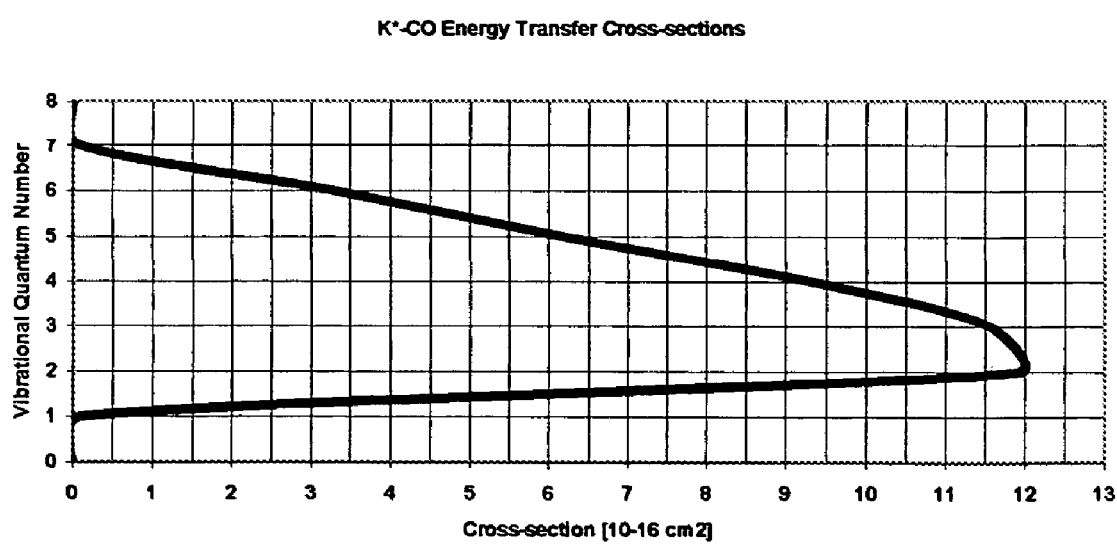
Figure 2C:
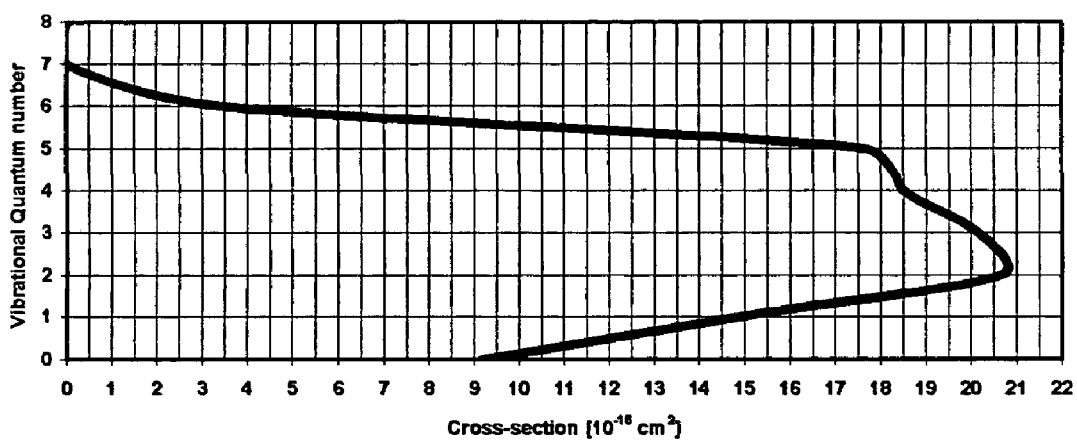

For purposes here of elucidating the requirements for achieving a useful diode-pumped alkali-molecular laser, we examine the case wherein carbon monoxide, CO, is the lasing molecular specie. FIG. 1 shows the basic energy level scheme for a diode-pumped alkali-CO mid-IR laser. The energy of the fundamental vibration of the CO molecule is ~2200 cm$^{-1}$. Neglecting anharmonic effects, CO overtone vibrational bands have energies of ~4400 cm$^{-1}$ (v=2), ~6600 cm$^{-1}$ (v=3), 8800 cm$^{-1}$ (v=4), 11,000 cm$^{-1}$ (v=5), and 13,200 cm$^{-1}$ (v=6). The energies of the first excited $^2P_{1/2,3/2}$ electronic levels of the potassium (K), rubidium (Rb), and cesium (Cs) atoms are: 12,985 and 13,043 cm$^{-1}$ (K); 12,579 and 12,816 cm$^{-1}$ (Rb), and 11,178 and 11732 cm$^{-1}$ (Cs). FIG. 1 shows the juxtaposition of the first 6 vibrational levels of CO and the $^2P$ levels (shown as a single degenerate level) of potassium. The $^2P$ levels of Rb and Cs lie progressively closer to the v=5 vibrational level of CO. In the present invention, radiation from a semiconductor laser pump source excites the alkali atom into either or both of the excited $^2P$ levels. This excitation energy may be transferred to any of the vibrational levels of the CO molecule upon collision with the excited alkali atom, indicated schematically by the dashed lines in FIG. 1, according to the process:

$$A^*+CO(v=0) A+CO^*(v=j)+KE\ j=1-6 \quad \text{(Eq. 1)}$$

where "*" indicates excitation energy, and KE represents translational energy, or excess energy not taken up as vibrational or rotational energy. The expectation that ro-vibronic population inversions can be efficiently generated in collisions between alkali atoms excited to the their $^2P$ levels and these molecules derives from detailed calculations [ref. 8] of the state-to-state (E–V) energy transfer cross-sections for nitrogen, $N_2$, and CO molecules, shown in FIGS. 2A–2C.

These calculations show that alkali electronic energy is preferentially transferred to excited vibrational levels of the CO molecule. In the case of Rb* energy is preferentially transferred to the v=3 and v=2 vibrational levels, with virtually zero cross-section for transfer to either the v=1 first excited vibrational level, or to the v=0 vibrationless ground level. The same result obtains for K* energy transfer to CO. In the case of Cs*, there are also substantial cross-sections to excite the higher lying v=4,5,6 vibrational levels, as well as the lower lying v=1 and v=0 levels.

Note that the magnitudes of the cross-sections for populating the v=2,3 levels of CO in the cases of K* and Rb*, are >10 A$^2$~10$^{-15}$ cm$^2$. Assuming a collision speed of approximately 5×10$^4$ cm/sec, the energy transfer rate for 20 torr of CO (6×10$^{17}$/cc) is estimated to be:

$$W_{transfer} \sim 10^{-15} \times 5 \times 10^5 \times 6 \times 10^{17} sec^{-1} \sim 3 \times 10^7 sec^{-1}. \quad \text{(Eq. 2)}$$

This rate for a single E–V channel is comparable to the spontaneous emission rate of the $^2P$ levels of the alkali atoms, so multi-channel E–V quenching should compete favorably with radiative decay of the excited alkali atoms. In contrast, the deactivation [ref. 9] rate of vibrationally excited $N_2$ (and presumably CO) molecules by ground state potassium, for example, is about 100 times smaller than the A*+CO E–V process rate. Since the working density of the alkali atoms is expected [ref. 5] to be <10$^{14}$/cc, the quenching rate of CO vibrational energy by ground level alkali atoms will be much smaller than the E–V transfer rate of Eq. 2.

It is known that collisions among the vibrationally excited CO molecules will redistribute the energy among the vibrational levels, exciting some higher lying levels through the anharmonic pumping process [ref. 10] and also populating the v=0,1 levels to some degree. This implies that each quantum of electronic energy may create several quanta of vibrational energy, which may ultimately be harvested as mid-IR laser energy. This provides the possibility of achieving laser action with a quantum yield in excess of unity (e.g., a higher efficiency than is indicated by a "Manley-Rowe" relationship: conversion efficiency<$\lambda_{pump}/\lambda_{laser}$~800 nm/5000 nm~0.16 for operation on a fundamental band of CO; or conversion efficiency<$\lambda_{pump}/\lambda_{laser}$~800 nm/2500 nm~0.38 for operation on a $1^{st}$ overtone band of CO.

Figure 3:
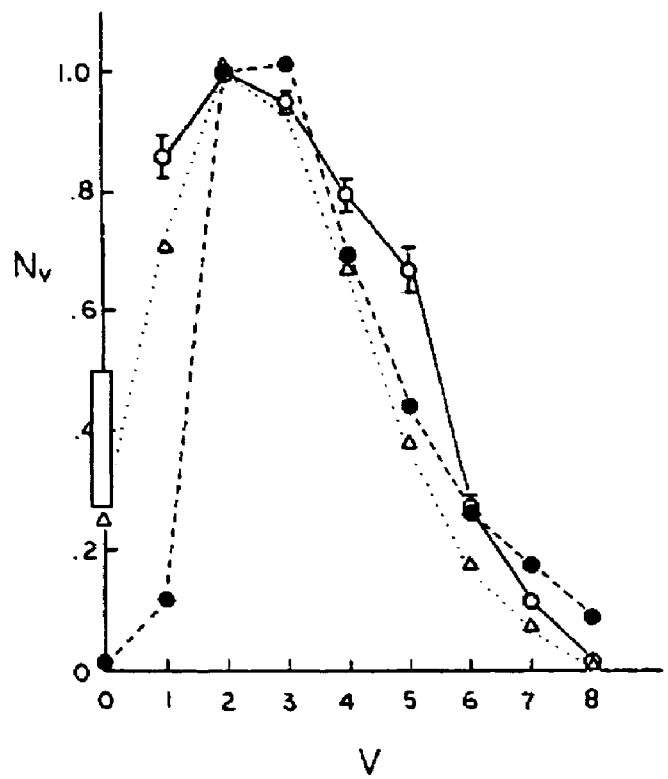
FIG. 3 shows relative vibrational populations in the Na*+CO system.

Given the preferential transfer of energy into several higher lying vibrational levels of CO, absolute vibrational population inversions may be generated, for example, between the v=3 and v=2, 1, 0 vibrational levels, enabling both P- and R-branch laser oscillations in the v=3 to v=2 band centered at 4.75 µm. Both P- and R-branch laser oscillations in the overtone v=3 to v=1 band centered at 2.3 µm may also be enabled. Similarly, the presence of absolute vibrational population inversions between the v=2 and v=1 levels, and between the v=2 and v=0 levels, enable both P- and R-branch laser emission on these two band transitions. Using a tunable dye laser as an excitation source of sodium, vibrational level population inversions were experimentally observed in the Na*+CO system, as determined by absorption of radiation from a CO probe laser [ref. 11], see FIG. 3.

While absolute vibrational population inversions are desired, even if only partial population inversions are generated (i.e., $T_{vibration} > T_{rotation} \sim T_{transition}$), such inversions can still be exploited for P-branch laser oscillations in the bands mentioned above, as discussed by Polanyi [ref. 12].

As noted above, the design of an alkali-CO laser must provide for an E-to-V transfer rate well in excess of the radiative decay rate of the excited alkali atom. As shown above, it is feasible to accomplish this by direct energy transfer from alkali to CO. However, it may be preferable to transfer the electronic energy to an intermediary molecular species, such as nitrogen ($N_2$), which also manifests [ref. 8] the same type of preferential transfer to higher lying vibrational levels (v=4–6) as does CO. By using nitrogen as an intermediate store of vibrational energy, one can set the E–V energy transfer rate (relative to the radiative decay rate of the alkali atoms) by selecting the nitrogen partial pressure, while leaving the selected CO partial pressure to optimize the laser spectroscopic and kinetic properties of the laser medium.

In analogy with the preceding novel insight regarding alkali-enabled amplification and/or laser action in hetero-nuclear diatomic CO, it is clear that novel amplification and/or laser action may be achieved upon optically pumping an appropriate mixture of alkali vapor, e.g., any one of the hetero-nuclear diatomic molecules HF, DF, HCl, DCl, HBr, DBr, etc., and buffer gas(es), provided that the molecular species is not overly chemically reactive with the alkali atoms of the laser mixture.

It is also well known [ref. 13] that laser action at ~10.6 µm and ~9.6 µm can be obtained in a mixture of carbon dioxide and nitrogen, when the nitrogen molecules are vibrationally excited in an electrical discharge. The vibrationally excited nitrogen molecules efficiently transfer this excitation to the $CO_2$ molecules forming a vibrational level population inversion between the [$00^01$]–[$10^00$] levels, and between the [$00^01$]–[$02^00$] levels of $CO_2$. Given the insights disclosed above regarding the novel realization of diode pumped alkali-diatomic hetero-nuclear molecular amplifiers and/or lasers, it is now clear that novel amplification and/or laser action may be achieved in $CO_2$ upon optically pumping an appropriate mixture of an alkali vapor, carbon dioxide, nitrogen, and possibly other buffer gases (again, provided that the $CO_2$ molecules are not unduly chemically reactive with the alkali atoms in the laser mixture). And by further analogy, it is also now clear that novel laser action can be achieved upon optically pumping an appropriate mixture of an alkali vapor, nitrous oxide ($N_2O$), nitrogen, and possibly other buffer gases.

In these respects, the diode pumped alkali-molecular amplifier and laser schemes according to the present invention substantially departs from the conventional concepts and designs of the prior art, and in so doing provides practical optically pumped mid-infrared hetero-nuclear molecular lasers.

Figure 4:
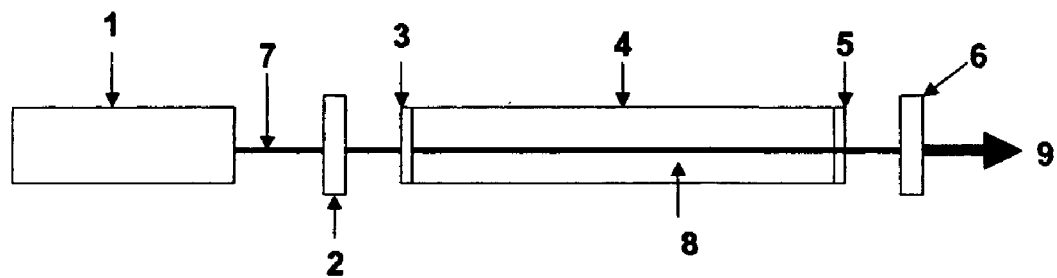
FIG. 4 shows a basic embodiment of the diode-pumped alkali-molecular laser.

Referring now to FIG. 4, the basic architecture and elements of an embodiment of a diode-pumped mid-infrared alkali-molecular laser comprises a semiconductor laser pump source 1 producing a pump beam 7, an active gain medium 8 contained in the active medium gain cell 4 fitted with enclosing first window 3 and second window 5, and a laser resonator cavity formed by first mirror 2 and second mirror 6. The active gain medium 8 comprises a mixture of alkali vapor, hetero-nuclear molecular gas (active gain specie), and appropriate buffer gas(es). The active gain medium cell 4 is placed within the laser resonator cavity formed by resonator cavity mirrors 2 and 6. The pump source 1 has a wavelength $\lambda_p$ substantially matching the wavelength of either the $D_1$ or the $D_2$ transition of the alkali vapor in the active gain medium. Excitation of the gain mixture produces population inversions among certain ro-vibrational transitions of the hetero-nuclear molecules in the gain mixture and laser emission at mid-infrared wavelength(s) $\lambda_l$. Gain cell 4 windows 3 and 5, are highly transparent at pump and laser wavelengths, $\lambda_p$ and $\lambda_l$, respectively. The cell windows may be oriented with their surface normals parallel to the cell axis, or the cell end windows may be fitted to the ends of the cell at the Brewster angle to lower cell insertion losses. The surface of the first resonator cavity mirror 2 (gain cell side) is coated with a dichroic dielectric stack that transmits the pump beam 7 at wavelength $\lambda_p$ with a substantially low loss, and highly reflects at mid-infrared wavelengths $\lambda_l$. The surface of the second resonator cavity mirror 6 (gain cell side) is coated with a dichroic dielectric stack that highly reflects at the pump wavelength $\lambda_p$ and partially transmits radiation at laser wavelengths $\lambda_l$. The degree of transmissivity at wavelengths $\lambda_l$ is adjusted to optimize the conversion of pump radiation into output laser radiation. The beam of radiation 7 from the pump source 1 is directed into the gain cell 4 through the first mirror 2 and the first cell window 3 and is propagated through the gain cell generally co-aligned with the symmetry axis of the gain cell 4. The axis of the laser resonator cavity formed by mirrors 2 and 6 is substantially co-aligned with the pump beam 7. The curvatures of, and spacing between, the laser resonator cavity mirrors 2 and 6 are selected to maximize the overlap between the volume of excitation of the pump beam in the gain medium and the desired mode volume of the laser resonator cavity. Pump radiation that is not absorbed in a first pass through the active medium gain cell, is passed back through the gain cell for a second pass upon reflection from the second resonator cavity mirror 6. Pump radiation absorbed by the alkali vapor atoms excites alkali atoms to their $^2P_{1/2,3/2}$ electronic energy levels. Some of this excitation energy is subsequently transferred to hetero-nuclear molecules in the mixture of the active gain medium via collisions between the excited alkali atoms and the hetero-nuclear molecules (either directly, or through an intermediary diatomic gas such as nitrogen), dissipating excess excitation energy as heat in the diluent buffer gas. This energy transfer process results in the generation of population inversions and optical gain among certain of the ro-vibrational levels of the hetero-nuclear molecules. With sufficient pump intensity, this gain becomes larger than the passive losses within the laser resonator cavity, and laser action in mid-infrared wavelengths $\lambda_l$ will occur, producing an output laser beam 9.

As a specific example of a diode-pumped alkali-molecular laser we consider carbon monoxide, CO, as the active hetero-nuclear laser active specie. The gain cell contains a mixture of an alkali vapor (preferably selected from among the specific alkali atoms, cesium, Cs, rubidium, Rb, or, potassium, K) because their respective $D_1$ or $D_2$ excitation transitions (895, 852, 795, 780, 770, 766 nm, respectively) well match the emission wavelengths provided by conventional semiconductor laser diodes. Several choices of combinations of buffer gases are appropriate for use in a CO laser, including rare-gases such as helium or argon, together with a second diatomic molecular gas such as nitrogen. Output radiation from the CO laser occurs at various discrete wavelengths lying in the range of approximately 4.7 to 5.4 microns.

Figure 5:
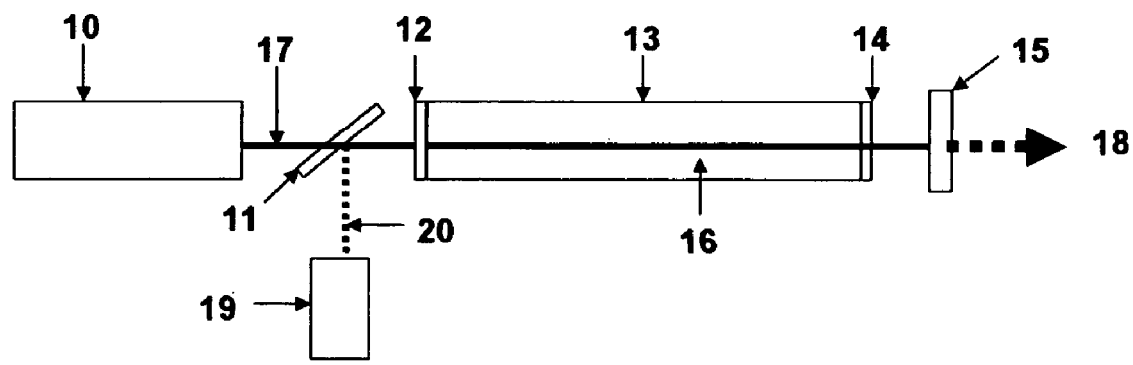
FIG. 5 shows a basic embodiment of the diode-pumped alkali-molecular amplifier.

In addition to the laser implementation described above, the diode-pumped alkali-molecular active medium may be utilized in the master oscillator, power amplifier (MOPA) configuration shown in FIG. 5. The basic architecture and elements of a diode-pumped mid-infrared alkali-molecular amplifier comprises a semiconductor laser pump source 10 producing a pump beam 17, an active gain medium 16 contained in the active medium gain cell 13 fitted with enclosing first window 12 and second window 14, a master oscillator 19 producing amplifier seed beam 20, pump and seed beam combining optic 11, and dichroic amplifier output mirror 15. As in the laser configuration, the active gain medium 16 in the amplifier configuration comprises a mixture of alkali vapor, hetero-nuclear molecular gas (active gain specie), and appropriate buffer gas(es). The pump source 10 has a wavelength $\lambda_p$ substantially matching the wavelength of either the $D_1$ or the $D_2$ transition of the alkali vapor in the active gain medium. Excitation of the gain mixture produces population inversions among certain ro-vibrational transitions of the hetero-nuclear molecules in the gain mixture and optical gain at mid-infrared wavelength(s) $\lambda_l$. Gain cell 13 windows 12 and 14, are highly transparent at pump and laser wavelengths, $\lambda_p$ and $\lambda_l$, respectively. The cell windows may be oriented with their surface normals parallel to the cell axis, or the cell end windows may be fitted to the ends of the cell at the Brewster angle to lower cell transmission losses. The amplifier output mirror 15 is coated with a dichroic dielectric stack that highly reflects at the pump wavelength $\lambda_p$ and highly transmits radiation at the amplifier wavelengths $\lambda_l$. The gain cell is placed between the pump laser source 10 and the amplifier output mirror 15, with the axis of the gain cell 13 co-aligned with the beam 17 of the pump source 10. The dichroic beam combiner 11 is placed between the pump source 10 and the active gain cell 13. The beam combiner 11 highly transmits the pump beam 17 at wavelength $\lambda_p$ and highly reflects the seed beam 20 of the master oscillator 19 at wavelengths $\lambda_l$. The beam combiner optic 11 is oriented so as to spatially combine the pump beam 17 and the master beam amplifier input beam 20, and overlap these beams within the active gain cell 13. Pump radiation that is not absorbed in a first pass through the active medium gain cell, is passed back through the gain cell 13 for a second pass upon reflection from the amplifier output mirror 15. Pump radiation absorbed by the alkali vapor atoms excites alkali atoms to their $^2P_{1/2,3/2}$ electronic energy levels. Some of this excitation energy is subsequently transferred to hetero-nuclear molecules in the mixture of the active gain medium via collisions between the excited alkali atoms and the hetero-nuclear molecules (either directly, or through an intermediary diatomic gas such as nitrogen), dissipating excess excitation energy as heat in the diluent buffer gas. This energy transfer process results in the generation of population inversions and optical gain wavelengths $\lambda_l$ among certain of the ro-vibrational levels of the hetero-nuclear molecules. In the presence of this gain, the power in the seed beam 20 from the master oscillator 19 is amplified upon passing through the gain cell 13, producing the higher-power amplifier output beam 18 at wavelengths $\lambda_l$.

In addition to carbon monoxide as the active hetero-nuclear molecule in a diode-pumped alkali-molecular laser or amplifier, HF, DF, HCl, DCl, etc. are analogous hetero-nuclear active molecules that may be used in diode-pumped alkali-molecular lasers and amplifiers. Similarly, diode-pumped alkali-molecular amplifiers and lasers using tri-atomic hetero-nuclear laser active gain specie such as $CO_2$, $N_2O$, etc., can be also anticipated.

The manner of usage and operation of the present invention will be apparent to those skilled in the art from the above description.

References:
1] Harold C. Miller, Dan Radzykewycz and Gordon Hager, U. S. Pat. No. 5,774,490, "Diode-Pumped Mm:YAG/HBr Four Micron Laser System".
2] John E. McCord, Harold C. Miller, Gordon Hager, Alan I. Lampson, and Peter G. Crowell, "Experimental Investigation of an Optically Pumped Mid-Infrared Carbon Monoxide Laser", IEEE J. Q. E., 35, 1602–1612 (1999).
3] J. E. McCord, A. A. Ionin, S. P. Phipps, P. G. Crowell, A. I. Lampson, J. K. McIver, A. J. W. Brown, and G. D. Hager, "Frequency-tunable Optically Pumped Carbon Monoxide Laser", IEEE J. Q. E., 36, 1041–1052 (2000).
4] S. V. Vassiliev, M. A. Kyzmina, T. T. Basiev, and G. D. Hager, "Numerical modeling and optimization of the optically pumped mid-infrared molecular laser", "High-Power Laser Ablation IV, Proc. SPIE, 4760, 1067–1077 (2002).
5] W. F. Krupke, U.S. Pat. No. 6,643,311 B2, "Diode-Pumped Alkali Laser".
6] W. F. Krupke, R. J. Beach, V. K. Kanz, and S. A. Payne, "Resonance transition 795 nm ruibidium laser", Optics Letters, 28, 2336 (2003).
7] See, for example, Handbook of Laser Science and Technology, Volume II, Gas Lasers, pp313–409. M. J. Weber, editor. CRC Press, Boca Raton, Fla., 1982.
8] E. R. Fisher and G. K. Smith, "Vibration-Electronic Coupling in the Quenching of Electronically Excited Alkali Atoms by Diatomics", Applied Optics, 10, 1803–1813 (1971).
9] E. R. Fisher and G. K. Smith, "Vibrational relaxation by metal atoms", Chem Phys. Lett, 6, 438–440 (1970).
10] N. Legay, N. Legay-Sommaire, and G. Taieb, "Mechanism of a CO—$N_2$ laser-I. Study of the vibrational populations", Can. J. Phys., 48, 1949–1955 (1970).
11] David S. Y. Hsu and M. C. Lin, "Electronic-to-Vibrational Energy Transfer Reactions: Na($3\ ^2P$)+CO($^1\Sigma$, v=0)", Chem. Phys. Lett, 42, 78–83 (1976).
12] J. C. Polanyi, "Vibrational-Rotational Population Inversion", Applied Optics, Suppl. 2, 109 (1965).
13] C. K. N. Patel, "Continuous-wave laser action on the vibrational-rotational transitions of $CO_2$, Phys. Rev, 136, 1187 (1964).

The above 13 references are incorporated herein by reference.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:
1. An apparatus, comprising:
a gain cell, containing a gaseous laser medium comprising a mixture of alkali vapor having $D_1$ and $D_2$ transitions, hetero-nuclear molecular gas, and at least one buffer gas;
a semiconductor laser pump source configured to optically pump said alkali vapor with a pump beam at a pump wavelength comprising the wavelength of either of said $D_1$ or $D_2$ transitions; and a laser resonant cavity containing said gain cell and said gaseous laser medium.

2. The apparatus of claim 1, wherein said hetero-nuclear molecular gas is selected from the group consisting of CO, $CO_2$, HF, DF, HCl, DCl, HBr and DBr.

3. The apparatus of claim 1, wherein said at least one buffer gas is selected from the group consisting of helium, argon and nitrogen.

4. The apparatus of claim 1, wherein said alkali vapor comprises vapor atoms selected from the group consisting of cesium (Cs), rubidium (Rb) and potassium (K).

5. The apparatus of claim 4, wherein when said alkali vapor comprises cesium, said pump wavelength is approximately 852 nm or 895 nm, wherein when said alkali vapor comprises rubidium, said pump wavelength is approximately 780 nm or 795 nm, wherein when said alkali valor comprises potassium, said pump wavelength is approximately 766 nm or 770 nm.

6. The apparatus of claim 1, wherein said pump wavelength comprises a wavelength that will provide laser excitation of said alkali vapor through wing-pumping said alkali vapor.

7. The apparatus of claim 1, wherein said hetero-nuclear molecular gas is selected from the group consisting of CO, $CO_2$, HF, DF, HCl, DCl, HBr and DBr, wherein said at least one buffer gas is selected from the group consisting of helium, argon and nitrogen, wherein said alkali vapor comprises vapor atoms selected from the group consisting of cesium (Cs), rubidium (Rb) and potassium (K), wherein when said alkali vapor comprises cesium, said pump wavelength is approximately 852 nm or 895 nm, wherein when said alkali vapor comprises rubidium, said pump wavelength is approximately 780 nm or 795 nm, wherein when said alkali valor comprises potassium, said pump wavelength is approximately 766 nm or 770 nm.

8. An apparatus, comprising:
a gain cell, containing a gaseous laser medium comprising a mixture of alkali vapor having $D_1$ and $D_2$ transitions, hetero-nuclear molecular gas, and at least one buffer gas;

a semiconductor laser pump source configured to optically pump said alkali vapor with a pump beam at a pump wavelength comprising the wavelength of either of said $D_1$ or $D_2$ transitions a master oscillator seed source of optical radiation producing a seed beam at a wavelength matching the wavelength of a rotational-vibrational transition of said hetero-nuclear molecular gas; and means for spatially combining said pump beam and said seed beam in said gain cell.

9. The apparatus of claim 8, wherein said hetero-nuclear molecular gas is selected from the group consisting of CO, $CO_2$, HF, DF, HCl, DCl, HBr and DBr, wherein said at least one buffer gas is selected from the group consisting of helium, argon and nitrogen, wherein said alkali vapor comprises vapor atoms selected from the group consisting of cesium (Cs), rubidium (Rb) and potassium (K), wherein when said alkali vapor comprises cesium, said pump wavelength is approximately 852 nm or 895 nm, wherein when said alkali vapor comprises rubidium, said pump wavelength is approximately 780 nm or 795 nm, wherein when said alkali valor comprises potassium, said pump wavelength is approximately 766 nm or 770 nm.

10. The apparatus of claim 8, wherein said hetero-nuclear molecular gas is selected from the group consisting of CO, $CO_2$, HF, DF, HCl, DCl, HBr and DBr.

11. The apparatus of claim 8, wherein said at least one buffer gas is selected from the group consisting of helium, argon and nitrogen.

12. The apparatus of claim 8, wherein said alkali vapor comprises vapor atoms selected from the group consisting of cesium (Cs), rubidium (Rb) and potassium (K).

13. The apparatus of claim 12, wherein when said alkali vapor comprises cesium, said pump wavelength is approximately 852 nm or 895 nm, wherein when said alkali vapor comprises rubidium, said pump wavelength is approximately 780 nm or 795 nm, wherein when said alkali valor comprises potassium, said pump wavelength is approximately 766 nm or 770 nm.

14. The apparatus of claim 8, wherein said pump wavelength comprises a wavelength that will provide laser excitation of said alkali vapor through wing-pumping said alkali vapor.

15. A method, comprising:
providing a gain cell, containing a gaseous laser medium comprising a mixture of alkali vapor having $D_1$ and $D_2$ transitions, hetero-nuclear molecular gas, and at least one buffer gas;

placing said gain cell and said gaseous laser medium within a laser resonant cavity;

providing a semiconductor laser pump source configured to optically pump said alkali vapor with a pump beam at a pump wavelength comprising the wavelength of either of said $D_1$ or $D_2$ transitions; and optically pumping said alkali vapor with said pump beam.

16. The method of claim 15, wherein said hetero-nuclear molecular gas is selected from the group consisting of CO, $CO_2$, HF, DF, HCl, DCl, HBr and DBr.

17. The method of claim 15, wherein said at least one buffer gas is selected from the group consisting of helium, argon and nitrogen.

18. The method of claim 15, wherein said alkali vapor comprises vapor atoms selected from the group consisting of cesium (Cs), rubidium (Rb) and potassium (K).

19. The method of claim 18, wherein when said alkali vapor comprises cesium, said pump wavelength is approximately 852 nm or 895 nm, wherein when said alkali vapor comprises rubidium, said pump wavelength is approximately 780 nm or 795 nm, wherein when said alkali valor comprises potassium, said pump wavelength is approximately 766 nm or 770 nm.

20. The method of claim 15, wherein said pump wavelength comprises a wavelength that will provide laser excitation of said alkali vapor through wing-pumping said alkali vapor.

21. The method of claim 15, wherein said hetero-nuclear molecular gas is selected from the group consisting of CO, $CO_2$, HF, DF, HCl, DCl, HBr and DBr, wherein said at least one buffer gas is selected from the group consisting of helium, argon and nitrogen, wherein said alkali vapor comprises vapor atoms selected from the group consisting of cesium (Cs), rubidium (Rb) and potassium (K), wherein when said alkali vapor comprises cesium, said pump wavelength is approximately 852 nm or 895 nm, wherein when said alkali vapor comprises rubidium, said pump wavelength is approximately 780 nm or 795 nm, wherein when said alkali valor comprises potassium, said pump wavelength is approximately 766 nm or 770 nm.

22. A method, comprising:
   providing a gain cell, containing a gaseous laser medium comprising a mixture of alkali vapor having $D_1$ and $D_2$ transitions, hetero-nuclear molecular gas, and at least one buffer gas;
   providing a semiconductor laser pump source configured to optically pump said alkali vapor with a pump beam at a pump wavelength comprising the wavelength of either of said $D_1$ or $D_2$ transitions;
   optically pumping said alkali vapor with said pump beam;
   providing a master oscillator seed source of optical radiation producing a seed beam at a wavelength matching the wavelength of a rotational-vibrational transition of said hetero-nuclear molecular gas; and
   spatially combining said pump beam and said seed beam in said gain cell.

23. The method of claim 22, wherein said hetero-nuclear molecular gas is selected from the group consisting of CO, $CO_2$, HF, DF, HCl, DCl, HBr and DBr, wherein said at least one buffer gas is selected from the group consisting of helium, argon and nitrogen, wherein said alkali vapor comprises vapor atoms selected from the group consisting of cesium (Cs), rubidium (Rb) and potassium (K), wherein when said alkali vapor comprises cesium, said pump wavelength is approximately 852 nm or 895 nm, wherein when said alkali vapor comprises rubidium, said pump wavelength is approximately 780 nm or 795 nm, wherein when said alkali valor comprises potassium, said pump wavelength is approximately 766 nm or 770 nm.

24. The method of claim 22, wherein said hetero-nuclear molecular gas is selected from the group consisting of CO, $CO_2$, HF, DF, HCl, DCl, HBr and DBr.

25. The method of claim 22, wherein said at least one buffer gas is selected from the group consisting of helium, argon and nitrogen.

26. The method of claim 22, wherein said alkali vapor comprises vapor atoms selected from the group consisting of cesium (Cs), rubidium (Rb) and potassium (K).

27. The method of claim 26, wherein when said alkali vapor comprises cesium, said pump wavelength is approximately 852 nm or 895 nm, wherein when said alkali vapor comprises rubidium, said pump wavelength is approximately 780 nm or 795 nm, wherein when said alkali valor comprises potassium, said pump wavelength is approximately 766 nm or 770 nm.

28. The method of claim 22, wherein said pump wavelength comprises a wavelength that will provide laser excitation of said alkali vapor through wing-pumping said alkali vapor.

* * * * *